United States Patent [19]

Lunt et al.

[11] Patent Number: 4,576,972
[45] Date of Patent: Mar. 18, 1986

[54] CLOSED CELL PHENOLIC FOAM

[75] Inventors: James Lunt, Brights Grove; Edwin J. MacPherson; Paul J. Meunier, both of Sarnia, all of Canada

[73] Assignee: Fiberglas Canada, Inc., Ontario, Canada

[21] Appl. No.: 760,050

[22] Filed: Jul. 29, 1985

Related U.S. Application Data

[62] Division of Ser. No. 676,262, Nov. 29, 1984, Pat. No. 4,546,119.

[51] Int. Cl.⁴ .............................. C08J 9/14
[52] U.S. Cl. ............................ 521/136; 521/131; 521/181; 521/188; 525/498; 525/504
[58] Field of Search ............... 521/131, 136, 181, 188; 525/498, 504

[56] References Cited

U.S. PATENT DOCUMENTS

| Re. 30,375 | 8/1980 | Deuzeman et al. | 524/21 |
|---|---|---|---|
| 2,845,396 | 7/1958 | Krebs et al. | 521/106 |
| 3,271,331 | 9/1966 | Ender | 521/112 |
| 3,389,094 | 6/1968 | D'Alessandro | 521/114 |
| 3,707,414 | 12/1972 | Wismer et al. | 156/78 |
| 3,872,033 | 3/1975 | Boden et al. | 521/181 |
| 3,876,620 | 4/1975 | Moss | 411/445 |
| 3,885,010 | 5/1975 | Bruning et al. | 264/46.2 |
| 3,907,723 | 9/1975 | Pretot | 521/112 |
| 3,915,905 | 10/1975 | Hanton | 521/128 |
| 3,953,645 | 4/1976 | Moss | 428/304.4 |
| 3,968,300 | 7/1976 | Moss et al. | 428/304.4 |
| 4,140,842 | 2/1979 | Beale et al. | 521/129 |
| 4,165,413 | 8/1979 | Sefton et al. | 521/128 |
| 4,176,106 | 11/1979 | Reid et al. | 524/843 |
| 4,176,216 | 11/1979 | Reid et al. | 521/106 |
| 4,216,295 | 8/1980 | Dahms | 521/112 |
| 4,219,623 | 8/1980 | Sudan et al. | 521/85 |
| 4,247,413 | 1/1981 | Beale et al. | 252/356 |
| 4,252,908 | 2/1981 | Paladini | 521/117 |
| 4,303,758 | 12/1981 | Gusmer | 521/121 |
| 4,309,527 | 1/1982 | McAllister et al. | 528/138 |
| 4,345,061 | 8/1982 | Hasselman, Jr. | 528/161 |
| 4,409,361 | 10/1983 | McAllister et al. | 524/876 |
| 4,417,004 | 11/1983 | Sudan et al. | 521/181 |
| 4,423,163 | 12/1983 | Doerge | 521/181 |
| 4,424,289 | 1/1984 | Meyer et al. | 521/103 |

FOREIGN PATENT DOCUMENTS 0066967 12/1982 European Pat. Off. .
0066968 12/1982 European Pat. Off. .
2085886 5/1982 United Kingdom .

Primary Examiner—Morton Foelak
Attorney, Agent, or Firm—Parkhurst & Oliff

[57] ABSTRACT

This invention relates to the manufacture of foam from phenolic resins and to the foam so produced. In order to overcome some of the limitations of the prior art closed cell phenolic foams, we have developed a method of preparing closed cell foams from modified, low cost phenol formaldehyde resoles, which exhibit high closed cell contents, low friability and low thermal conductivity. This specification provides a foam competitive with urethane foams, which have an aged thermal conductivity of about 0.16K. or less, but which will not generate fumes as toxic as those of urethane. There is, provided a method of making a phenolic foam material comprising the steps of (1) preparing a base catalyzed phenol-formaldehyde resole having a mole ratio of phenol to formaldehyde of between 1:3 and 1:4.5 and containing substantially no free phenol but including residual formaldehyde;

(2) neutralizing, concentrating and acidifying said resole;

(3) reacting with co-reactants consisting essentially of urea and resorcinol in an amount such that the molar ratio of combined urea and resorcinol to free formaldehyde in said resole is about 1:1, the ratio of urea to formaldehyde being selected so that in a test starting at ambient temperature a reaction temperature of 70° to 75° C. is reached during foaming within a period of 4 to 8 minutes, the urea being reacted first where urea and resorcinol are separately reacted with the resole;

(4) (a) combining the product of step 3 with a surfactant in an amount sufficient to be effective as a cell stabilizer and
(b) a blowing agent in an amount sufficient to form a foam;

(5) initiating foam formation by adding to the mixture of step 4 a catalyst comprising an acidic material to reduce the pH of the mixture to below 4;

(6) curing the mixture of step 5.

2 Claims, 4 Drawing Figures

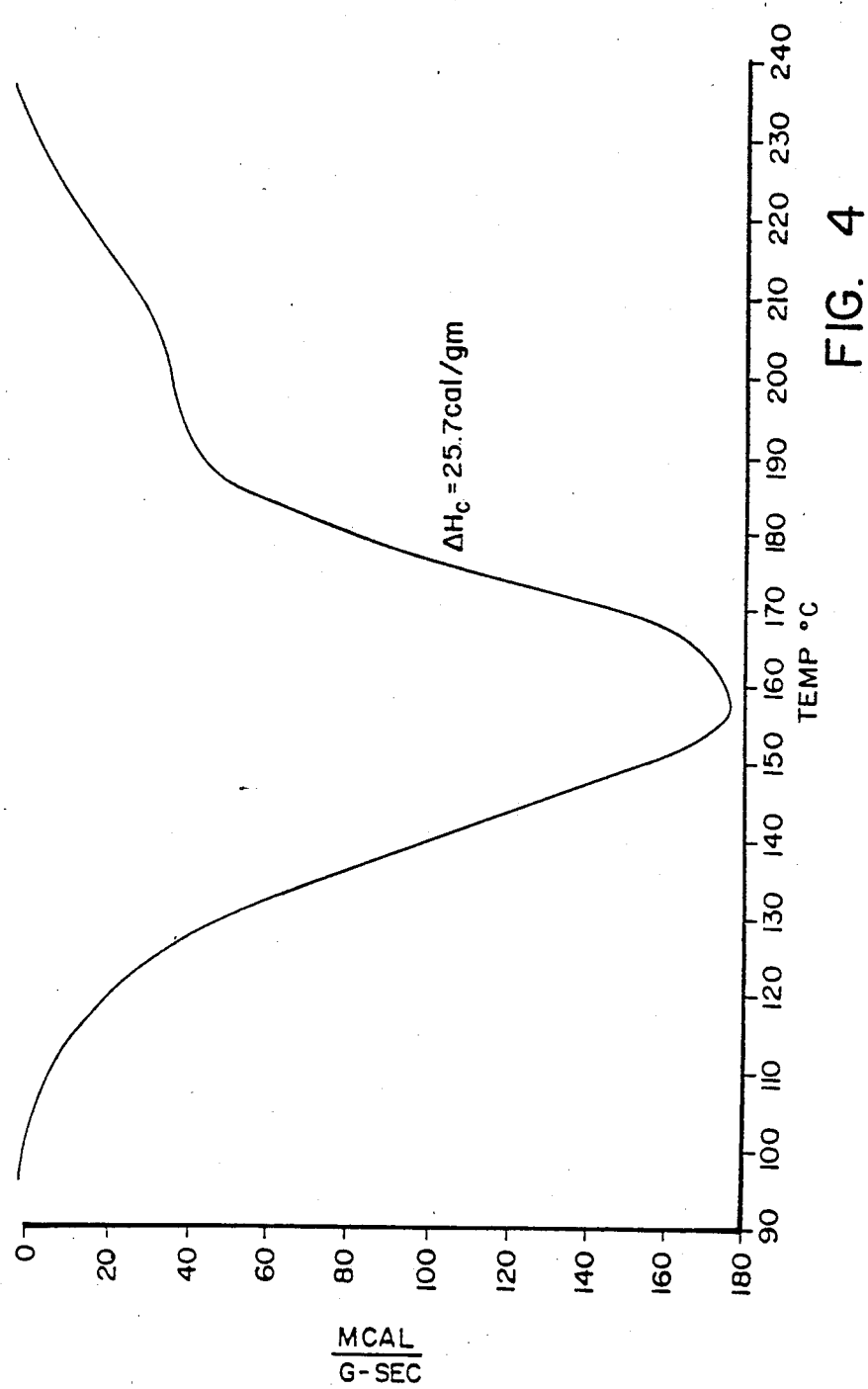

4,576,972

CLOSED CELL PHENOLIC FOAM

This is a division of application Ser. No. 676,262 filed Nov. 29, 1984, now U.S. Pat. No. 4,546,119.

This invention relates to the manufacture of foam from phenolic resins and to the foam so produced.

This invention is an improvement with respect to the invention described in U.S. application Ser. No. 385,260 filed June 4, 1982 by inventors M. H. Rastall, N. H. Ng, and E. J. MacPherson, and the same assignee, and entitled "Modified Phenolic Foams", the contents of which are incorporated herein by reference. In that application phenol-formaldehyde foams are prepared from resoles having a high starting mole ratio of formaldehyde to phenol, and which are essentially free of phenol. Treatment with a formaldehyde scavenger or co-reactant reduces the initially high free formaldehyde content.

It is important for the purpose of producing a foam having a high proportion of closed cells to control the foaming reaction to avoid disruption of the cell structure, otherwise thermal conductivity will be adversely affected, particularly if a volatile blowing agent is used having a thermal conductivity less than that of air. Thus Gusmer in U.S. Pat. No. 4,303,758 dated Dec. 1, 1981 and entitled "Method of Preparing Closed Cell Phenol-Aldehyde Foam and the Closed Cell Form thus Produced" uses a comparatively low phenol to formaldehyde ratio of 1:2.0 to 3.0 to provide a resole having a low exothermic heat of reaction.

In accordance with this invention a different approach to that of Gusmer has been utilized. We use a high starting mole ratio of formaldehyde to phenol. The reaction is controlled by using urea and resorcinol as formaldehyde scavengers in a ratio which will result in a reaction temperature of 70° to 75° C. being reached in a test of foaming commencing at ambient temperature within a period of 4 to 8 minutes.

Further improvements are achieved in accordance with other more detailed aspects of this invention by pH adjustment of the resin prior to foaming, selection of blowing agent, selection and level of surfactant, viscosity control, and control of other variables.

The general object of this invention is to overcome the deficiencies of prior art methods and materials. These materials have been found to be either deficient in the maintenance of their closed cell character and thus, long term thermal performance, or one or more property has been deficient, such as dimensional stability, water absorption, friability, tendency to punk, corrosivity, compressive strength, etc., rendering the material unsuitable for commercial use as an insulant.

In other prior art disclosures concerning closed cell phenolics, the proposed preparation relies on uneconomical production methods which operate at low speeds.

In order to overcome some of the limitations of the prior art closed cell phenolic foams, we have developed a method of preparing closed cell foams from modified, low cost phenol formaldehyde resoles, which exhibit high closed cell contents, low friability and low thermal conductivity.

A further object is to provide a foam competitive with urethane foams, which have an aged thermal conductivity of about 0.16K. or less, but which will not generate fumes as toxic as those of urethane.

In accordance with this invention there is provided a method of making a phenolic foam material comprising the steps of (1) preparing a base catalysed phenol-formaldehyde resole having a mole ratio of phenol to formaldehyde of between 1:3 and 1:4.5 and containing substantially no free phenol but including residual formaldehyde;

(2) neutralizing, concentrating and acidifying said resole;

(3) reacting with co-reactants consisting essentially of urea and resorcinol in an amount such that the molar ratio of combined urea and resorcinol to free formaldehyde in said resole is about 1:1, the ratio of urea to formaldehyde being selected so that in a test starting at ambient temperature a reaction temperature of 70° to 75° C. is reached during foaming within a period of 4 to 8 minutes, the urea being reacted first where urea and resorcinol are separately reacted with the resole;

(4) (a) combining the product of step 3 with a surfactant in an amount sufficient to be effective as a cell stabilizer and (b) a blowing agent in an amount sufficient to form a foam;

(5) initiating foam formation by adding to the mixture of step 4 a catalyst comprising an acidic material to reduce the pH of the mixture to below 4;

(6) curing the mixture of step 5.

There is also provided a phenolic foam material comprising the reaction product of (1) an aqueous solution of a base-catalyzed phenol-formaldehyde resole having a mole ratio of phenol to formaldehyde of between 1:3 and 1:4, said solution containing substantially no free phenol, the pH of said solution having been adjusted with carbon dioxide to between about 6 and 8 and the resulting precipitate having been removed and having been concentrated to a viscosity at 30° C. of more than about 15,000 centipoises and the pH having been adjusted by the addition of an acid to about pH 3 to 4;

(2) urea and resorcinol, the amount of urea and the amount of resorcinol being selected such that the mole ratio of urea and resorcinol to residual formaldehyde contained in said resole is about 1:1 and the weight ratio of urea to resorcinol is about 2:1 to 3:1.

In one aspect the ratio of phenol to formaldehyde may be above 1:3.1 and/or below 1:4.3.

In the drawings,

FIG. 4 shows the normalized cure thermogram for phenol formaldehyde resin extended with urea, as a basis for comparison with FIG. 3.

Figure 1:
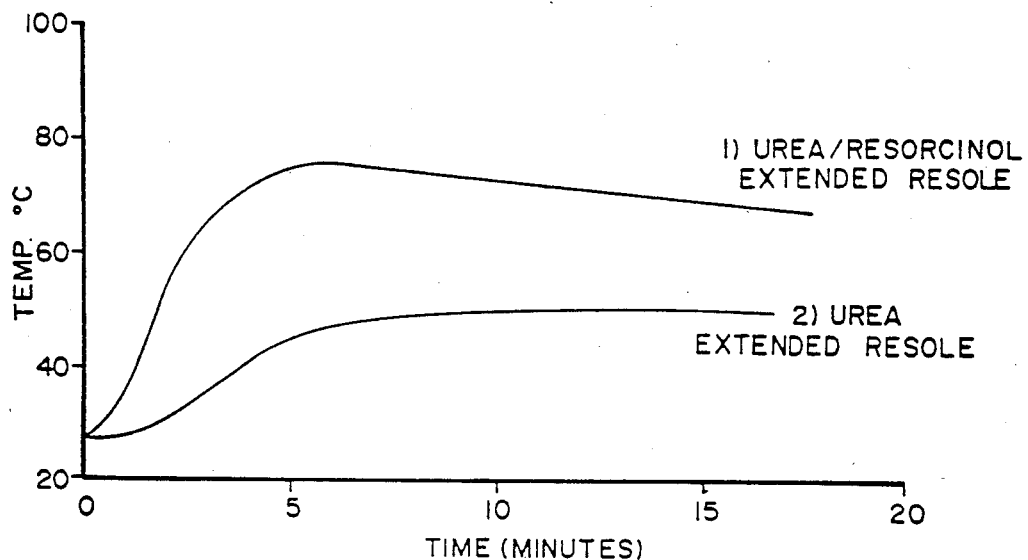
FIG. 1 is a plot of cure exotherms comparing a urea-resorcinol extended resole with a urea extended resole.

The steps in preparing foams in accordance with the preferred practice of this invention are as follows:

1. Preparation of resole resin.
2. Neutralize.
3. Filter.
4. Concentrate.
5. Adjust the pH by the addition of an acid.
6. Add urea and resorcinol to the resin.
7. Add a surfactant and a blowing agent.
8. Add acid catalyst and allow to foam.
9. Cure.

Resin Type and Preparation

These foams are prepared from resoles which have been made using starting mole ratios of phenol to formaldehyde in the range of 1:3 to 1:4.5 and preferably 1:3 to 1:4. Of particular utility are resoles prepared using phenol to formaldehyde starting mole ratios of 1:3.7 with calcium oxide as the basic catalyst. Resoles of this type have been disclosed in said U.S. application Ser. No. 385,260, and in U.S. Pat. No. Re. 30,375 of Aug. 19, 1980, of the same assignee, incorporated herein by reference.

Such high mole ratios are the basis for resins which are, for all practical purposes, free of phenol and which can be treated with a formaldehyde co-reactant, or a scavenger, in order to reduce the initially high free formaldehyde content. Nitrogen containing co-reactants are particularly beneficial as they improve fire resistant properties of the foam.

EXAMPLE 1

Preparation of Preferred Resole Resin

A phenol formaldehyde (P/F) resole resin of P/F charge ratio 1:3.7 was prepared by loading a reactor with 2,235 gallons of 44% aqueous formaldehyde and 912 gallons of USP 98% phenol. The agitator was started and the catalyst, 880 lbs, of calcium hydroxide (99% purity) was metered in over a period of about one hour and thirty five minutes.

The temperature at this point was about 86° F. It was held at 86° F. for about 25 minutes, then the temperature was allowed to rise to 110° F. for about 28 minutes. The temperature was then allowed to rise to 125° F. in 20 minutes and held at 125° F. for about 40 minutes. The temperature was allowed to rise to 150° F. in 50 minutes and held at 150° F. for about 55 minutes until the free formaldehyde content dropped to 8.2%. The mixture was cooled to 80° F. and the final pH was measured as 8.7. Typical properties of this type of resin are given in Table I.

TABLE I

| TYPICAL RESIN PROPERTIES | |
|---|---|
| Oven Solids % (2 hrs. @ 150° C.) | 46.0 Min. |
| Ash % (@ 1500° F.) | 1.7 Min |
| pH | 8.7 |
| % Free Formaldehyde | 8.2–8.8 |
| Dilutability | ∞ |
| Viscosity (@ 30° C.) | 20 cps |
| Specific Gravity (@ 25° C.) | 1.19 |
| TYPICAL COMPONENT ANALYSIS* | |
| | % |
| Phenol | .34 |
| o-methylol phenol | .51 |
| p-methylol phenol | .55 |
| total mono-methylol phenols | 1.56 |
| total dimethylol phenols | 2.19 |
| total trimethylol phenols | 22.48 |
| total diphenyls | 14.36 |
| heavier components | 2.4 |

The number average molecular weight was found to be 230
*Data obtained from gas chromatographic analyses of resin sample after silylization with BSTFA, using 2,4-dimethylol-phenol as an internal standard.

Neutralizing

The storage stability of the resin is improved by reducing the pH to the region of 5.5 to 6.5 through the use of a neutralizing acid selected so as to produce a resin which, on concentration, has the characteristics required to generate a closed cell foam.

The following acids were evaluated as resole neutralizing agents:
1. Carbon dioxide gas
2. Phosphoric acid
3. Sulfuric acid
4. Acetic acid
5. Lactic acid
6. Citric acid
7. Oxalic acid
8. Sulfamic acid Of these acids, carbon dioxide is preferred for three reasons:

1. The insolubility of the calcium carbonate precipitate (where calcium hydroxide has been used as the basic catalyst) facilitates its removal by filtration.
2. The carbonate neutralized resole exhibits desirable reactivity properties when further catalyzed during foam preparation.
3. The rate of viscosity increase of the carbonate neutralized resole during foaming is instrumental in maintaining low blowing agent losses.

The reactivity of the resole when neutralized with these various acids was assessed in the following manner:

EXAMPLE 2

The resole of Example 1 was first concentrated to 70% oven solids and then treated with a formaldehyde co-reactant, such as resorcinol and urea. The amount of co-reactant used was sufficient to give a 1:1 mole ratio of free formaldehyde to resorcinol and urea.

When the co-reactant had reduced the formaldehyde level in the resin, a known weight of a 65% aqueous solution of phenol sulfonic acid was added and the mixture stirred rapidly. The rate of viscosity increase with time was monitored using a Brookfield viscometer. The results are presented in Table II.

TABLE II

| EFFECT OF NEUTRALIZING ACIDS ON RESOLE ACTIVITY | | |
|---|---|---|
| Neutralizing Acid | Initial Viscosity of Resorcinol Extended Resole (25° C.) | Time to Reach 1.8 MM cps |
| Carbon dioxide | 46,300 | 5 min. |
| Phosphoric | 51,400 | No appreciable viscosity increase |
| Sulfuric | 27,300 | 3 min. 35 sec. |
| Acetic | 25,900 | No appreciable viscosity increase |
| Citric | 24,550 | No appreciable viscosity increase |
| Oxalic | 40,200 | 4 min. 40 sec. |
| Sulfamic | 203,000 | 4 min. 25 sec. |

The benefits of carbon dioxide as the neutralizing agent are further illustrated in the following Example 3.

EXAMPLE 3

A modified resole (83.9 g) containing resorcinol, urea and about 8% by weight of Pluronic F-127 (trade mark) was mixed with Freon 113 (trade mark), in sufficient quantity to produce the desired density. When a stable emulsion had been produced, as evidenced by no weight loss, the appropriate amount of catalyst, consisting of a 67% blend of Witco M-100 (trade mark) in ethylene glycol, was added and the mixture rapidly stirred before pouring into a 12"×12"×2" steel mold preheated to 80° C. The mold was then sealed and placed in an oven at 80°–90° C. for 15–30 minutes. The resultant foam was trimmed, dried at 50° C. for 24 hours and then placed in a humidity cabinet at 50% R.H. for 24 hours.

The results of preparing foams by this procedure using a modified P/F 1:3.7 calcium catalysed resole, neutralized with different acids, are given in Table III. From Table III, it can be seen that the best overall foam properties for these systems, in terms of % closed cells, initial K and % friability were achieved using carbon dioxide as the resole neutralizing agent. Oxalic acid, in this instance, gave a high initial K and a high friability. Carbon dioxide is therefore preferred as the neutralizing agent for the resole resins.

TABLE III

EFFECT OF NEUTRALIZING ACIDS ON FOAM PROPERTIES

| Neutralizing Acid (Neutralized to pH 6.5) | Foam Density pcf | % Closed Cells (ASTM C.518) | Initial K Value (K=BTU in./ (ft² .hr.°F.) | % Friability (as per ASTM C.421-77) |
|---|---|---|---|---|
| Carbon dioxide gas | 2.87 | 92 | .12 | 14 |
| Phosphoric Acid | 2.63 | 18 | .25 | 34 |
| Sulfuric Acid | 2.92 | 77 | .150 | 33 |
| Acetic Acid | — | — | — | — |
| Lactic Acid | — | — | — | — |
| Citric Acid | 2.86 | 6 | .25 | 56 |
| Oxalic Acid | 2.88 | 91 | .19 | 24 |
| Sulfamic Acid | 3.04 | 50 | .25 | 24 |

Resin P/F 1:3.7 Calcium catalysed - modified with urea and resorcinol as per Examples 2 and 3

Filtration

The previous steps of neutralizing together with filtration are illustrated below in Example 4.

EXAMPLE 4

The resole prepared above as in Example 1, was neutralized to pH 6.5 with carbon dioxide. The resulting precipitate of calcium carbonate was filtered off to reduce the calcium level in the resin to between 0.1–0.2%.

Concentration

To generate a closed cell foam from a phenolic resole it is advisable to remove as much volatile material from the resin as in practical. The concentration step is illustrated in Example 5.

EXAMPLE 5

The resin resulting from Example 4 was then concentrated to approximately 82–84% oven solids by passing the filtered resole through a thin film evaporator, operating with a wall temperature of 96° C. under a vacuum of 28 in. Hg°. The estimated residence time of the material in the evaporator was 20 seconds, prior to exiting and subsequent cooling. The resole prepared in this manner had the following proportions:

| | |
|---|---|
| Viscosity @ 30° C. (adjusted to 78% oven solids) | 22,000 cps |
| pH | 7.2 |
| Dilutability % | 1100 |
| Free Formaldehyde % | 13.5 |
| Calcium content | 0.2% |
| *Free Water % (Karl Fischer) | 1.89 |
| Refractive Index | 1.58 |
| No. Average Molecular Weight | ~240 |

*Measured at an organic oven solids level of 84.6%.

TABLE IV

| TYPICAL COMPONENT AND EFFLUENT ANALYSIS | | | |
|---|---|---|---|
| Results % | Initial P/F Resole | Resole Conc. | Distillate |
| Phenol | 0.62 | 0.66 | 0.58 |
| o-Methylol Phenol | 0.62 | 1.03 | 0.006 |
| p-Methylol Phenol | 0.64 | 1.06 | 0.008 |
| o,p-Dimethylol Phenol | 2.57 | 4.14 | 0.01 |
| o,o,p-Trimethylol Phenol | 22.5 | 34.21 | 0.075 |
| 4,4-Tetramethylol Phenol | 16.55 | 29.10 | — |
| Heavier Components | 2.22 | 14.27 | — |
| % Calcium | 0.13 | 0.28 | — |

Adjustment of the pH by the addition of an acid

The pH of the resole concentrate is adjusted to within the range 3 to 6 and preferably 3 to 4 using a suitable acid such as citric acid. This is to establish acidic conditions for the subsequent step of modifying with a co-reactant.

Preparation of a resole modified with a co-reactant

In Examples 6, 7 and 8 which follow, we will illustrate in Example 6 preparation of a resole modified with urea, which can be blended with the resole modified with resorcinol of Example 7. Alternatively, both the urea and resorcinol may modify the resole in a single stage as illustrated in Example 8. These examples also illustrate the preliminary adjustment of the pH.

In each of Examples 6, 7 and 8, urea, resorcinol or urea and resorcinol are added to the resole concentrate so as to provide essentially a 1:1 mole ratio of co-reactant to residual formaldehyde.

EXAMPLE 6

Preparation of a Urea Extended Resole

The pH of the resole concentrate is adjusted to 3.6 using a 20% citric acid solution. The free water content of the resole is then adjusted with deionized water, prior to adding powdered urea in sufficient quantity to react with all the free formaldehyde in a 1:1 mole ratio. The mixture is allowed to react at 27° C. to 30° C. until there is no evidence of undissolved urea. The required surfactant may also be added at this stage. The final urea extended resole typically exhibits a pH of between 5.5 to 6.0 and a viscosity measured at 30° C. of 40,000–100,000 cps, depending on the free water content.

EXAMPLE 7

Preparation of a Resorcinol Extended Resole

In this preparation, the resole concentrate is treated with citric acid to reduce the pH and with deionized water to adjust the water content, prior to treatment with sufficient resorcinol to react with the formaldehyde in a 1:1 mole ratio. The mixture is kept below 30° C. until all the resorcinol has reacted. The final pH is between 5.5 to 5.7 and the viscosity @30° C. is 60,000 to 100,000 cps.

The materials of Examples 6 and 7 can be blended in appropriate proportions such as from 3 to 4 parts of urea extended resole to 1 part of resorcinol extended resole to give a premix or a urea resorcinol extended resole can be made directly in one step, as in Example 8.

EXAMPLE 8

Preparation of a Urea-Resorcinol Modified Resole

As in the previous Examples 7 and 8, the resole is treated with citric acid to adjust the pH to 3.6 and deionized water is added to give the desired solids level. Powdered urea is then added to give a ratio of 0.82 moles of urea per mole of free formaldehyde. The mixture is stirred at 27°-30° C. until all the urea has dissolved and the free formaldehyde is 1.29%. Then 0.18 moles of resorcinol are added and stirring is continued until no undissolved material remains and residual formaldehyde is reduced to 0.31%. For convenience, the desired surfactant is usually added during the preparation of the modified resole. The actual weight ratio of urea to resorcinol in the example is 2.48:1.

Typical properties of this material are a pH of 5.5 to 5.7 and viscosity of 40,000-100,000 cps at 30° C., depending on the water content.

Modified resoles produced by the methods of Examples 6, 7 and 8 can be utilized to prepare closed cell phenolic foams.

The selected resin must have adequate reactivity to produce a degree of cure sufficient to yield a product that is dimensionally stable at the temperatures to which it will be subjected during use.

Although resin reactivity can be changed by varying the acid catalyst level, it is preferred that the acid level be held to a practical minimum to reduce potential for corrosion problems.

The inherent reactivity of a phenolic resin as we have already illustrated, is due, in part, to the neutralizing acid used in the pH adjustment of the initial resole. Other factors are the chemical components in the resole and the distribution of those components, the free water content, and the level of other volatile materials, such as free formaldehyde and free phenol.

We have found that the modified resoles of the present disclosure can be varied over a wide range of reactivity by varying the urea/resorcinol ratios.

In general, the addition of resorcinol increases the resole reactivity while urea moderates reactivity and also provides some improved punk resistance.

To achieve a degree of cure sufficient to ensure dimensional stability of the finished product during use, we have found it necessary for the resin reactivity to be such that a reaction temperature of 70°-75° C. is reached in a test of foaming commencing at ambient temperature in a period of between 4 to 8 minutes and preferably 6 minutes.

This method of foam preparation is preferred over the alternative method of precuring a froth at a lower temperature, followed by heat treatment at an elevated temperature. The former process would lend itself to faster production speeds with better overall economics.

Resin reactivity was assessed in the following manner: A mixture of 83.9 g of P/F resole which was modified with urea and resorcinol and contained 4.5% free water and 7.7% Pluronic F-127 surfactant, was mixed with Freon 113 until a stable emulsion containing 6.7 g of F-113 was obtained. To the emulsion was added 9.4 g of a 67% solution of M-100 acid in ethylene glycol and the material was stirred until homogeneous. The reaction mixture was then transferred to an insulated container and a thermocouple was used to measure the rate of change in temperature which was recorded on an xy plotter.

Figure 2:
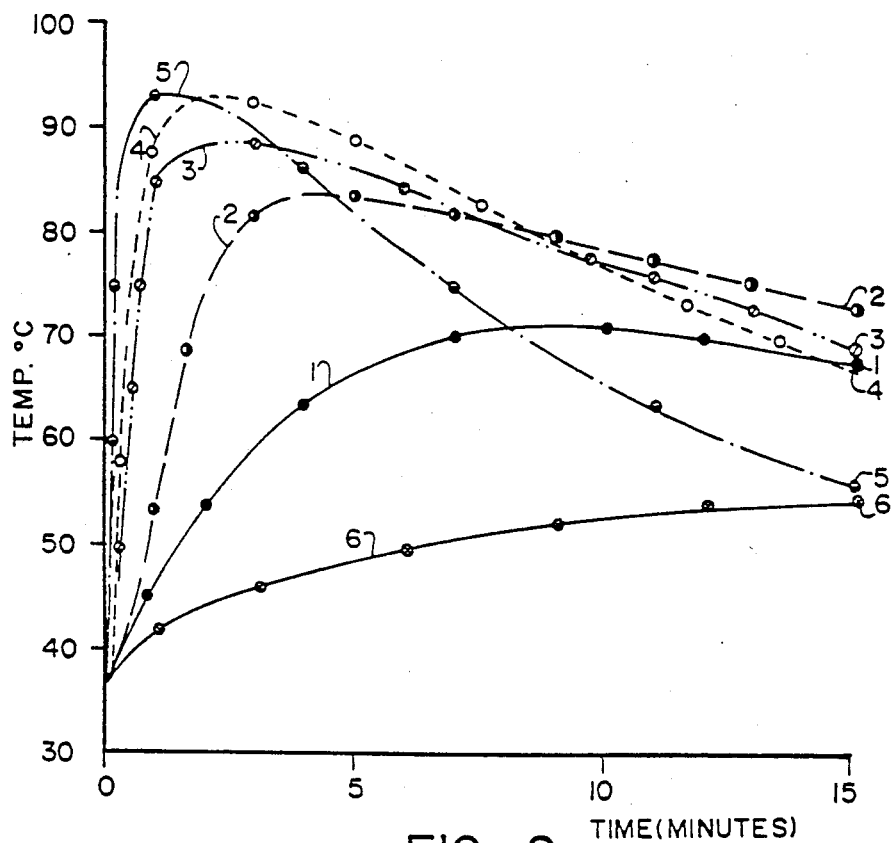
FIG. 2 shows a plot of cure exotherms for various ratios of urea and resorcinol.

Typically, the maximum temperature achieved starting from an ambient temperature of about 20° C. under these conditions was between 70°-75° C. in 4 to 8 minutes. This method was used to establish changes in reactivity versus changes in urea/resorcinol ratios, Freon levels and acid levels. Some examples of these plots are illustrated in FIGS. 1 and 2. It will be noted that under the specified conditions a weight ratio of urea to resorcinol of about 2:1 to 3:1 was best.

Once a desired formulation is established, minor variations in reactivity from the norm of 70° to 75° C. which occur due to slight differences from resin batch to batch, can be accommodated by varying the acid level over a narrow range.

In FIG. 1 the formulations were:

| FORMULATION | (1) | (2) |
|---|---|---|
| P/F Resole (80.9% o.s) | 57.9 | 55.85 |
| Water | 1.8 | 0.18 |
| Citric Acid | 0.1 | 0.09 |
| Urea | 13.4 | 15.87 |
| Resorcinol | 5.5 | — |
| Pluronic F127 | 4.9 | 0.82 |
| Freon 113 | 6.8 | 9.07 |
| M100 | 9.6 (in EG) | 18.13 (in DEG) |

EG = ethylene glycol
DEG = diethylene glycol

In FIG. 2 the formulations were:

| Sample No. | % P/F/U | % P/F/R | Wt. Ratio Urea:Resorcinol |
|---|---|---|---|
| 1 | 80 | 20 | 2.53:1 |
| 2 | 70 | 30 | 1.48:1 |
| 3 | 60 | 40 | 0.95:1 |
| 4 | 50 | 50 | 0.64:1 |
| 5 | 40 | 60 | 0.42:1 |
| 6 | 90 | 10 | 5.73:1 |

As mentioned above in the discussion of the reactivity of the co-reactant, it is considered important to understand and control the rate of exothermic reactions during foaming, in order to produce closed cell foams.

The resoles having the formulations indicated above were used to generate foams for exotherm studies. These plots are shown in FIGS. 1 and 2.

Increasing the resorcinol level as shown in FIG. 2 leads to a more rapid heat build up in the initial reaction stage. However, for the higher resorcinol level, the peak temperature is too high and will lead to rupture of the cells, due to excessive pressure produced by the water vapour.

Comparison of the time-temperature profiles shown in FIG. 1 illustrates the preferred temperature increase for the urea/resorcinol modified resole foam. In this example, the more rapid exotherm in the initial reaction stage is accompanied by an increased viscosity compared to the urea extended resole. Table V illustrates the comparative properties of these two foams.

TABLE V

COMPARISON OF
P/F/U AND P/F/U/R MODIFIED FOAMS

| Property | Urea Extended Resole (P/F/U) | Urea Resorcinol Extended Resole (P/F/U/R) |
|---|---|---|
| Density (pcf) | 3.01 | 2.83 |
| % Closed Cells | 0–13 | 94 |
| % Retained FREON | 0 | 5.3 |
| % Friability | 80 | 15 |

TABLE V-continued

COMPARISON OF P/F/U AND P/F/U/R MODIFIED FOAMS

| Property | Urea Extended Resole (P/F/U) | Urea Resorcinol Extended Resole (P/F/U/R) |
|---|---|---|
| Residual Cure (cal./g) | 25.7 | 17 |

Figure 3:
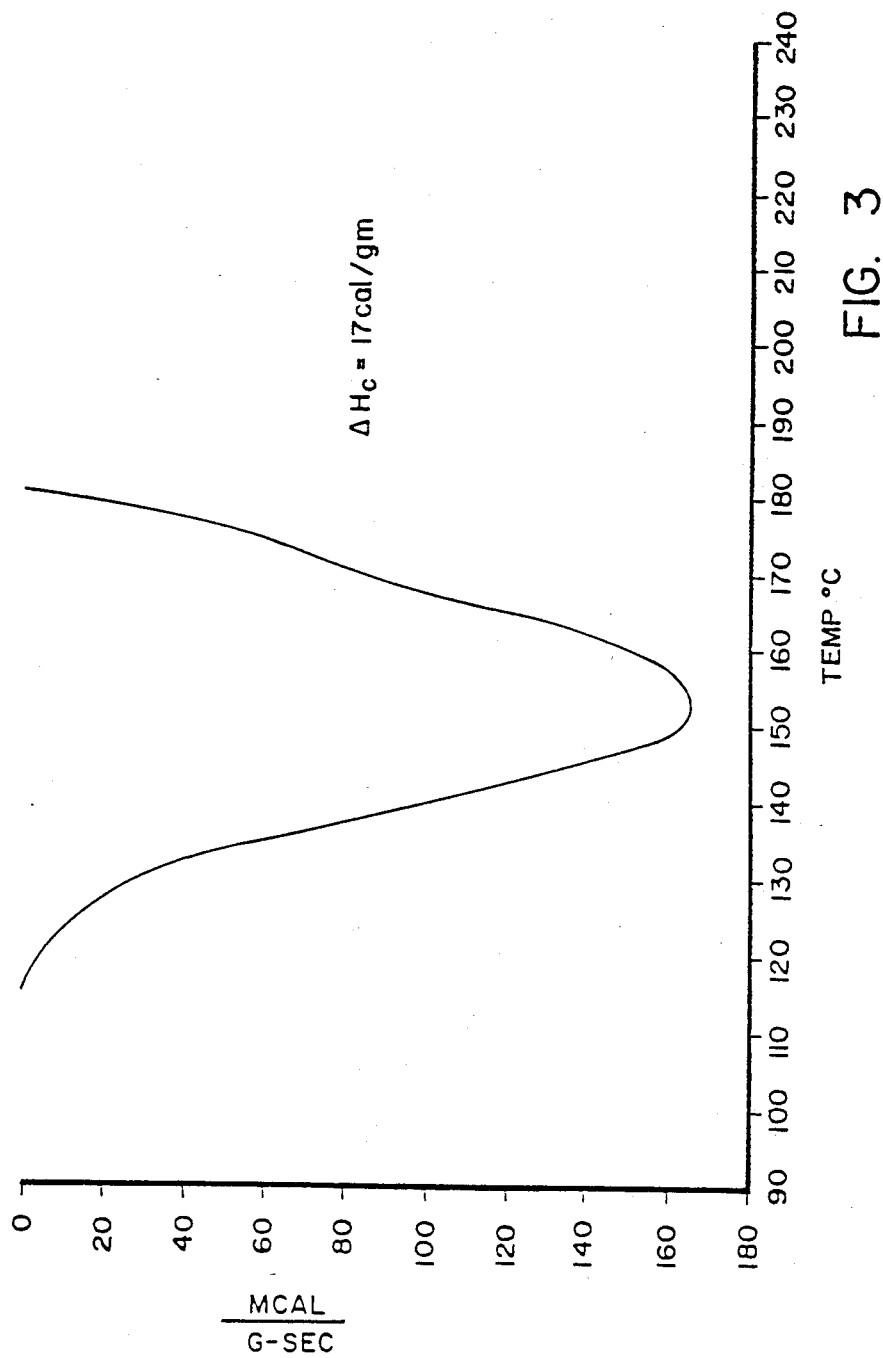
FIG. 3 shows the normalized cure thermogram for phenol-formaldehyde resin extended with urea/resorcinol.

The residual cure is determined on preconditioned samples using Differential Scanning Calorimetry. In this method, a sample is placed in a sealed pan to prevent loss of volatiles and subjected to a preprogrammed temperature rise of 10° C./min. Under these conditions, an exothermic peak is obtained when any further cure of the material occurs. The area under the curve is taken as a measure of the residual cure of the foam. The normalized cure profiles or thermograms for the P/F/U and P/F/U/R modified resoles are illustrated in FIGS. 3 and 4.

Addition of Surfactant and Blowing Agent

As indicated in Examples 6 and 8 the surfactant is usually, for convenience, added during preparation of the resole. The use of a surfactant is important to the production of a commercially acceptable phenolic foam. We have found that the type and concentration of surfactant are major factors in producing good closed cell foams.

The prior art describes the use of many types of surfactants which are suitable for use. Nonionic, cationic and even anionic types have been claimed. To produce closed cell foams which contain the blowing agent in sufficient amounts to given superior thermal values, (as compared to air filled materials). Careful selection of resin and surfactant properties is required. In addition, the level of surfactant is important, providing viscosity control of the reacting material, thus preventing premature drainage and thinning of the cell windows during the initial foam forming process. This phenomenon is well known and is described in various tests as the Gibbs and Marangoni effects.

We have found that the Pluronic (trade mark of BASF Wyandotte) type non-ionic surfactants are particularly suited to our system. Of particular utility are the higher molecular weight F-127, F-108 and F-98 polyethylene-polypropylene oxides, which, although difficult to disperse, tend to form very stable emulsions with Freons and which are quite insoluble in Freons. Polyethylene oxides or polypropylene oxides could also be used.

Surfactant concentrations can vary from 2 to 10% of the total formulation weight. The preferred level for the modified resole described herein is 6–8%.

EXAMPLE 9

The influence of surfactant level on foam properties is illustrated in Table VI. In these examples, a preferred surfactant, Pluronic F-127, a polyethylene-polypropylene oxide was utilized after experimentation with a large variety of surfactants. Pluronic F-127 indicated that it would provide superior performance in our particular resin system with regard to viscosity control, friability, closed cell content, initial thermal performance and maintenance of thermal performance.

In Table VI it can be seen that as the level of surfactant is increased, the viscosity of the resole blend also increased with surprising changes to the initial K, friability and closed cell contents. A viscosity above 30,000 cps at 30° C. is therefore preferred.

TABLE VI

INFLUENCE OF SURFACTANT CONCENTRATION ON FOAM PROPERTIES

| Surfactant Level Based on P/F Resole (Pluronic F-127 from BASF) | Viscosity of Blend @ 30° C. (cps) | Initial K value | % Friability (ASTM C. 421-77) | % Closed Cells (ASTM C. 518) |
|---|---|---|---|---|
| 2 | 20,000–25,000 | .123–.126 | 43 | 85 |
| 4 | 30,000–40,000 | .110–.115 | 30 | 92 |
| 10 | 46,000–50,000 | .107–.118 | 15 | 92 |

P/F 1:3.7 Calcium catalysed resole modified with urea and resorcinol.

The blowing agent must be added prior to foaming.

Any of the more common Freon blowing agents can be used to expand a phenolic resole. However, since we wish to lay down a liquid mixture onto a board-forming conveyor, as opposed to a froth, we prefer to use Freon-113 which normally boils at 47.6° C. We have found that, by careful selection of resin and surfactant properties, the Freon can be readily incorporated to produce a stable emulsion. This stable emulsion is such that minimal Freon losses occur during the expansion process. The Freon level can be varied over a wide range from 5 to 15%.

For the modified resoles as described herein, we prefer to use a 7% concentration of blowing agent to produce closed cell foams in the density range of 2.5 to 3.0 pcf with initial thermals of 0.10 to 0.11K.

Foaming

The next step is the initiation of foam formation with a catalyst.

In the preparation of phenolic foams, acid catalysts are used to initiate the exothermic curing reactions. In general, any acid capable of reducing the pH of the resole to between 1 to 4 and preferably between 2 and 3, will be suitable. In practice, not all of the common acids are used in spite of claims to the contrary. For example, hydrochloric acid is known to provide a very fine celled foam, but it also has potential to react with formaldehyde forming bis-chloromethylether, a carcinogen. Sulphuric, a very strong acid, is difficult to disperse in the resole and requires dilution to prevent local gelation from occurring. For these and other reasons, the organic sulfonic acids are preferred.

We prefer M-100 or Ultra TX (Trademarks of the Jim Walters Corp and Witco Chemicals) mixtures of toluene and xylene sulfonic acids, diluted in glycols to catalyse the cure of our modified resoles.

Curing

During the preparation of phenolic foams, volatiles are produced as a result of the condensation reactions which occur on crosslinking. These volatile materials, which comprise mainly water and formaldehyde must be removed during the drying and post curing process to produce a dimensionally stable product. The temperature at which this conditioning is carried out is selected so as to produce no significant deterioration in closed cell content, due to rapid release of these volatiles. Once the moisture content is reduced to a level consistent with the ambient moisture, the drying process is terminated.

Upon completion of this drying process, the thermal properties should show no further deterioration under the maximum temperature conditions encountered during use.

The upper service temperature for phenolic foam based insulation products, for example roof insulation, is about 80°-90° C. (176°-194° F.). Heating the product to 120° C. guarantees that the thermal properties will be maintained in typical service environments.

The following Table VII illustrates the thermal stability achieved as a result of treatment of the product at a temperature of 50° C. for 24 hours. It will be noted that treatment for further periods of time at successively higher temperatures did not result in a significant decrease in closed cell content. If on the other hand, the product had been subjected to a temperature as high as, say 100° C. without the preliminary treatment at 50° C., there would have been extensive rupturing of cells.

TABLE VII

| CLOSED CELL CONTENTS VS. HEAT TREATMENT | | |
|---|---|---|
| Temperature (°C.) | Time (hrs) | Closed Cell Content % |
| 50 | 24 | 95.0 |
| 60 | 22 | 94.1 |
| 78 | 22 | 93.9 |
| 80 | 20 | 95.0 |
| 100 | 25 | 93.8 |
| 120 | 22 | 92.0 |

Properties of the foam produced in accordance with this invention and further modification of such properties.

A multiplicity of tests are used to assess the properties and thus suitability of these closed cell foams as potential commercial insulating materials. It is believed that the most relevant properties are:
1. Compressive strength
2. Initial Thermals (K values)
3. Aged Thermals (=° C., 20% R.H.)
4. Density
5. Moisture Absorption
6. Flammability
7. Thermal and Dimensional Stability
8. Friability
9. Corrosivity Variations in thermal properties (K drift), moisture absorption, thermal stability and friability are among the chief areas of deficiency of prior art phenolic forms.

The following examples serve to illustrate the improvements in these properties in accordance with the preferred aspect of this invention.

Initial Thermal Properties

An open celled phenolic foam typically has a K value of 0.21 to 0.25 BTU in./hr.ft$^2$°F. when measured in accordance with ASTM C.411. The lower value is achievable only for very fine celled materials. These values are due to the presence of air in the foam structure.

Entrainment of blowing agent in the foam cells, particularly fluorinated hydrocarbons, pentane, cyclohexane, etc., can produce a significant reduction in this K value. The actual K values achieved will be related to the type and amount of blowing agent in the cells and the vapour pressure of the material.

Foams of the present invention containing 4-6% by weight of a fluorinated blowing agent, such as trichlorotrifluoroethane Freon®113 can exhibit K values of 0.11 to 0.12. In particular, foams prepared using Formulation 2 described below have an initial K value of 0.12 (after removing the moisture by drying for 24 hours at 50° C.), with retained blowing agent levels of 5 to 5.4%.

Aged Thermal Values

Ageing of these closed cell materials is a term used to describe the upward drift in K values with time. This drift in K value is well known in urethane foams and is considered to be due to two main factors. In the initial stages, gas diffusion into the foam, in the form of nitrogen or oxygen, occurs to equilibrate the pressure within the cellular structure. The presence of these gases along with the residual fluorocarbon type blowing agent produces an increase in the K value.

In addition, it is thought that some diffusion of the gaseous blowing agent out of the cells can occur, causing a further gradual increase in the K value. While both processes probably occur, we have found that these rates of diffusion can be significantly retarded, so that the change in K can be minimized. This will provide superior insulation properties over the lifetime of the foam in its end use application.

The following formulations serve to illustrate this K drift.

EXAMPLE 10

| FORMULATION 1 | % By Weight |
|---|---|
| P/F Resole (79.8% O.S.) (see Example 1) | 60.89 |
| Urea | 13.17 |
| Resorcinol | 2.55 |
| o-cresol | 2.50 |
| Freon 11B/113 60/40 ratio | 6.70 |
| 67% M-100+ in Ethylene Glycol | 7.98 |
| Water | 1.35 |
| Citric Acid H$_2$O | 0.10 |
| *Pluronic F-127 | 4.85 |

A foam made using this formulation exhibited the following properties:

| Density | 2.9 pcf |
|---|---|
| Closed Cells | 87% |
| Retained Blowing Agent | 1.0% |
| Initial K Value | 0.136 BTU in./hr.ft$^2$ °F. |
| ± Aged K value (after 8 days) at 50° C. | 0.18 |
| Closed Cell Content (after 10 days at 50° C.) | 85% |
| Retained Blowing Agent | <0.2% |

+ - M-100 is a commercially available mixture of toluene and xylene sulfonic acids manufactured by the Jim Walter Corporation.
± - Stored at 50° C.

EXAMPLE 11

| FORMULATION 2 | |
|---|---|
| P/F resole (80.2% O.S) | 60.94 |
| Urea | 12.11 |
| Resorcinol | 3.92 |
| Freon 113 | 6.67 |
| 67% M-100 in Ethylene Glycol | 9.44 |
| Water | 1.99 |
| Citric Acid $H_2O$ | 0.1 |
| Pluronic F-127 | 4.83 |

A foam made using this formulation exhibited the following properties:

| | |
|---|---|
| Density | 3.0 pcf |
| Closed Cells | 93% |
| Retained Blowing Agent | 5.36% |
| Initial K Value | 0.12 BTU in./hr. ft.$^2$ °F. |
| Aged K Value (after 8 days at 50° C.) | 0.11 |
| (after 100 days at 50° C.) | 0.12 |
| Retained Blowing Agent | 5.2% |

Foams made according to Formulation 2 exhibit a very low rate of K drift relative to those made using Formulation 1.

EXAMPLE 12

Moisture Absorption

Moisture uptake in cellular materials causes a decrease in the thermal insulation efficiency. In open celled foams, this moisture ingress can be as high as 25%, since the structure is readily permeable to water vapour. In closed cell phenolic foams, absorption of water vapour can occur if hydrophilic materials are present within the structure.

Careful selection of components used to make the foam can significantly alter the level of water vapour absorbed at any particular humidity.

To illustrate this phenomenon, various materials can be incorporated into the foam formulation. After preparation and curing, the foam samples are ground into powders and dried to constant weight at 50° C. The samples are then placed in a humidity chamber at 80% R.H. and 25° C. The % moisture uptake (as % weight gain) is measured after 24 hours. The results of some studies on acid and glycol variations are presented below in Table VIII. We have found that substitutions of diethylene glycol for the ethylene glycol diluent initially used leads to improved moisture resistance for our foam.

TABLE VIII

INFLUENCE OF VARIOUS ACIDS AND GLYCOLS ON MOISTURE UPTAKE

| Acid Concentration in Foam | M-100 67% in Ethylene Glycol | Sulfuric 67% in Ethylene Glycol | M-100 67% in Diethylene Glycol | M-100 No Ethylene Glycol |
|---|---|---|---|---|
| | % Moisture Uptake | | | |
| 0.04 mol. % | 9.4 | 5.1 | 5.0 | 6.8 |
| 0.03 | 7.1 | 4.0 | 4.4 | 5.8 |
| 0.02 | 7.0 | 3.5 | 4.1 | 4.9 |
| 0.01 | 4.3 | 5.0 | 4.8 | 4.2 |

EXAMPLE 13

In a second series of experiments, the effect of changing the surfactants on moisture uptake was studied. The results are shown in Table IX.

TABLE IX

INFLUENCE OF SURFACTANT TYPE AND LEVEL ON MOISTURE UPTAKE

| | % Moisture Uptake Surfactant levels (Based on Resole Solids) | | |
|---|---|---|---|
| Surfactant | 10 | 5 | 2 |
| #DC-193 | 8.2 | — | — |
| ± BRIJ-96 | 7.4 | — | — |
| *NIKKOL PBC-44 | 7.1 | — | — |
| °PLURONIC F-127 | 9.4 | 8.2 | 7.9 |

\# - Dow Corning polyalkyl siloxane polyoxyalkylene copolymer surfactant
± - I.C.I. Americas Inc. - polyoxyethylene oleyl ether surfactant
* - (trade mark) of NIKKO Chemicals, polyoxyethylene-polyoxypropylene cetyl ether surfactant.
° - (trade mark) of B.A.S.F. - polypropylene oxide polyethylene oxide surfactant.

Friability

Normally, unmodified phenolics are inherently brittle materials. This property is reflected in their poor resistance to abrasion when formed into cellular products. Another factor which contributes to the poor friability of prior art materials is the large cell size encountered in typical phenolic resole open celled and indeed, some closed cell materials.

We have found that by selection of resin and formulation characteristics, we can produce a significant improvement in this property.

In particular, we have found that the level of surface active agent can have a pronounced influence on friability. See, for example, Table V.

In addition, we have found other materials can be successfully incorporated into the formulation to further improve the friability without detriment to the thermal properties.

| Material | Level | % Friability |
|---|---|---|
| +POLYVIOL M13/40 | 2 parts | 14 |
| *PIOLOFORM BL-16 | 2.19 parts | 10 |

\+ - (trade mark) - a polyvinyl alcohol supplied by Wacker Chemie
* - (trade mark) - a polyvinyl formal supplied by Wacker Chemie.

In accordance with this invention a phenol formaldehyde foam material can be made having a closed cell content of at least 85%; a closed cell content after being heated for 24 hours at 120° C. of 85%; a friability of between about 5 and 15%; an initial thermal conductivity of below 0.12 BTU inch/ft$^2$h°F.; an aged thermal conductivity of less than 0.14 BTU inch/ft$^2$h°F. after 100 days at 50° C. and 20% relative humidity; a density of between about 1.75 and 2.75 pcf; and a moisture uptake at 25° C. and 80% relative humidity of less than 10%.

The embodiments of the invention in which an exclusive property or privilege is claimed are defined as follows:

1. A phenolic foam material comprising the reaction product of:
   (1) an aqueous solution of a base-catalyzed phenol-formaldehyde resole having a mole ratio of phenol to formaldehyde of between 1:3 and 1:4, said solution containing substantially no free phenol, the pH of said solution having been adjusted with carbon dioxide to between about 6 and 8 and the resulting precipitate having been removed, and having been concentrated to a viscosity of 30° C. of more than about 15,000 centipoises; and the pH having been adjusted by the addition of an acid to about pH 3 to 4;

(2) urea and resorcinol, the amount of urea and the amount of resorcinol being selected such that the mole ratio of urea and resorcinol to residual formaldehyde contained in said resole is about 1:1 and the weight ratio of urea to resorcinol is about 2:1 to 3:1 in the presence of a surfactant and a blowing agent.

2. A phenolic foam material according to claim 1 comprising a resole formed from phenol and formaldehyde in the mole ratio of 1:3 to 1:4 co-reacted with urea and resorcinol in the weight ratio of about 2:1 to 3:1, and in the mole ratio of urea and resorcinol combined to residual formaldehyde in the resole of about 1:1, said phenol foam material having a closed cell content of at least 85%, a closed cell content after being heated for 24 hours at 120° C. of 85%, a friability of between about 5 and 15%; an initial thermal conductivity of below 0.12 BTU inch/ft$^2$h°F., an aged thermal conductivity of less than 0.14 BTU inch/ft$^2$h°F. after 100 days at 50° C. and 20% relative humidity; a density of between about 1.75 and 2.75 pcf; and a moisture uptake at 20° C. and 80% relative humidity of less than 10%.

* * * * *

UNITED STATES PATENT AND TRADEMARK OFFICE
CERTIFICATE OF CORRECTION

PATENT NO. :   4,576,972

DATED      :       March 18, 1986

INVENTOR(S) :   James Lunt et al

It is certified that error appears in the above-identified patent and that said Letters Patent is hereby corrected as shown below:

Column 1, line 28, change "Form" to -- Foam --.

Column 5, line 46, change "in" to -- is --.

Column 9, line 48, change "given" to -- give --;

line 49, change the period to a comma;

change "Careful" to -- careful --.

line 50, "In addition" should start a new paragraph.

Column 11, line 50, change "(==°" to -- (50° --;

line 59, change "forms" to -- foams --.

Column 14, line 39, delete the period and insert -- , i.e.,: --.

Signed and Sealed this
Ninth Day of December, 1986

*Attest:*

DONALD J. QUIGG

*Attesting Officer*      *Commissioner of Patents and Trademarks*